(12) United States Patent
Bennett

(10) Patent No.: US 11,940,543 B2
(45) Date of Patent: *Mar. 26, 2024

(54) SEAMLESSLY TRACKING A WATER VESSEL USING SATELLITE AND MOBILE DATA

(71) Applicant: i911 International, Inc., Hallandale Beach, FL (US)

(72) Inventor: Christopher Ryan Bennett, St. Petersburg, FL (US)

(73) Assignee: i911 International, Inc., Hallandale Beach, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 18/143,333

(22) Filed: May 4, 2023

(65) Prior Publication Data

US 2023/0273325 A1 Aug. 31, 2023

Related U.S. Application Data

(63) Continuation of application No. 17/881,223, filed on Aug. 4, 2022, now Pat. No. 11,675,089, which is a
(Continued)

(51) Int. Cl.
*G01S 19/25* (2010.01)
*G05D 1/00* (2006.01)
(Continued)

(52) U.S. Cl.
CPC .......... *G01S 19/252* (2013.01); *G05D 1/0206* (2013.01); *G06N 20/00* (2019.01);
(Continued)

(58) Field of Classification Search
CPC ........ G01S 19/19; G05D 1/0206; G08G 3/00; G06N 20/00; H04W 4/00–029;
(Continued)

(56) References Cited

U.S. PATENT DOCUMENTS 8,396,656 B1 3/2013 Karmel
2002/0169527 A1 11/2002 Cline
(Continued)

FOREIGN PATENT DOCUMENTS

WO WO 2007/020523 A1 2/2007

OTHER PUBLICATIONS

International Search Report and Written Opinion, Patent Cooperation Treaty Application No. PCT/US2021/045241, dated Nov. 16, 2021, 15 pages.
(Continued)

*Primary Examiner* — San Htun
(74) *Attorney, Agent, or Firm* — Fenwick & West LLP

(57) ABSTRACT

A system and a method are disclosed for enabling seamlessly tracking a location of a water vessel by supplementing satellite data with mobile data location based on proximity of a water vessel to shore. The system receives a Global Positioning System (GPS) location of the water vessel, the GPS location of the water vessel based on using the satellite data of the water vessel. The system determines that the GPS location is within a threshold distance of a boundary. Responsive to determining that the GPS location is within the threshold distance of the boundary, the system initiates monitoring for a mobile signal emanating from a trajectory path of the water vessel. The system detects, during the monitoring, the mobile signal, the tracking the location of the water vessel based on mobile data of the mobile signal. The system provides the tracked location to a monitoring device.

20 Claims, 8 Drawing Sheets

Related U.S. Application Data continuation of application No. 16/998,428, filed on Aug. 20, 2020, now Pat. No. 11,448,773.

(51) Int. Cl.

| | |
|---|---|
| *G06N 20/00* | (2019.01) |
| *G08G 3/00* | (2006.01) |
| *H04W 4/024* | (2018.01) |
| *H04W 4/029* | (2018.01) |
| *H04W 64/00* | (2009.01) |
| *H04W 84/06* | (2009.01) |
| *H04W 4/38* | (2018.01) |

(52) U.S. Cl.
CPC .............. *G08G 3/00* (2013.01); *H04W 4/024* (2018.02); *H04W 4/029* (2018.02); *H04W 64/003* (2013.01); *H04W 64/006* (2013.01); *H04W 4/38* (2018.02); *H04W 84/06* (2013.01)

(58) Field of Classification Search
CPC ........... H04W 4/38; H04W 4/42; H04W 4/90; H04W 8/00–16
See application file for complete search history.

(56) References Cited

U.S. PATENT DOCUMENTS

| | | |
|---|---|---|
| 2004/0111195 A1* | 6/2004 | Vries ..................... G01C 21/20 |
| | | 701/469 |
| 2008/0079608 A1 | 4/2008 | Morrell |
| 2011/0140884 A1 | 6/2011 | Santiago et al. |
| 2013/0063300 A1 | 3/2013 | O'Regan et al. |
| 2014/0274225 A1* | 9/2014 | Lacatus ............ H04W 52/0241 |
| | | 455/574 |
| 2019/0137618 A1 | 5/2019 | Hawker |
| 2020/0196102 A1 | 6/2020 | Denninghoff |
| 2020/0225385 A1* | 7/2020 | O'Donncha ............ G01W 1/10 |
| 2022/0122464 A1* | 4/2022 | Franklin ................ G06Q 50/28 |

OTHER PUBLICATIONS

United States Office Action, U.S. Appl. No. 16/998,428, filed Mar. 24, 2022, 21 pages.
United States Office Action, U.S. Appl. No. 16/998,428, filed Nov. 19, 2021, 19 pages.
United States Office Action, U.S. Appl. No. 17/881,223, filed Dec. 23, 2022, 16 pages.

\* cited by examiner

SEAMLESSLY TRACKING A WATER VESSEL USING SATELLITE AND MOBILE DATA

CROSS REFERENCE TO RELATED APPLICATIONS

This application is a continuation of U.S. application Ser. No. 17/881,223, filed Aug. 4, 2022, which is a continuation of Ser. No. 16/998,428, filed Aug. 20, 2020, each of which is incorporated herein by reference in its entirety.

TECHNICAL FIELD

The disclosure generally relates to the field of locating a water vessel, and more specifically relates to near shore location tracking a water vessel.

BACKGROUND

While it is possible to locate users on land with a high level of accuracy, this is a result of having multiple dedicated systems that work together to triangulate land location, such as Global Positioning System (GPS), mobile cell towers, and additional sensors. This level of accuracy cannot be achieved off-shore because these systems do not exist off-shore. In order to have their locations tracked, larger commercial water vessels may have dedicated location technology that triggers a location to be sent via satellite to a tracking tool periodically. These water vessels can share their location information with a central server for tracking purposes. However, these location tracking mechanisms are computationally and practically expensive, and thus locations are sent infrequently (e.g., every 15 minutes). While this infrequently updated location information may be effective on the open ocean, they may not be as effective near-shore (e.g., within twenty miles from shore) as more granular update may be needed for commercial purposes, mariner safety, and rescue purposes. This results in a hampered ability to track commercial water vessels for providing updates on a central server, to provide a more frequent location update of the water vessels near-shore to improve mariner safety, and to find mariners who may be in distress, thus resulting in failed rescue efforts where a distressed mariner cannot be found. Moreover, smaller (typically personal) water vessels often do not have these satellite tracking mechanisms, and even if they did, they tend to travel at faster speeds that would make their trajectory impossible to calculate with such infrequent location markers. This results in a blind spot for rescue agencies regarding smaller water vessels, having little to no data or old data of smaller water vessels.

In modern times, many people, including mariners on board a water vessel, carry mobile phones that are capable of determining and transmitting location information when within cell phone range (e.g., within twenty miles from shore). However, even if a water vessel is within cell phone range, there is no existing infrastructure to link the location information of a mobile phone of a user on the water vessel to the location information of the water vessel, and thus this information is not readily translatable to the location of a distressed mariner. This being the case, even where a distressed mariner is able to make contact with a rescue agency, such as the United States Coast Guard, there would be no suitable manner of sharing the location of the mariner.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

Figure 1:
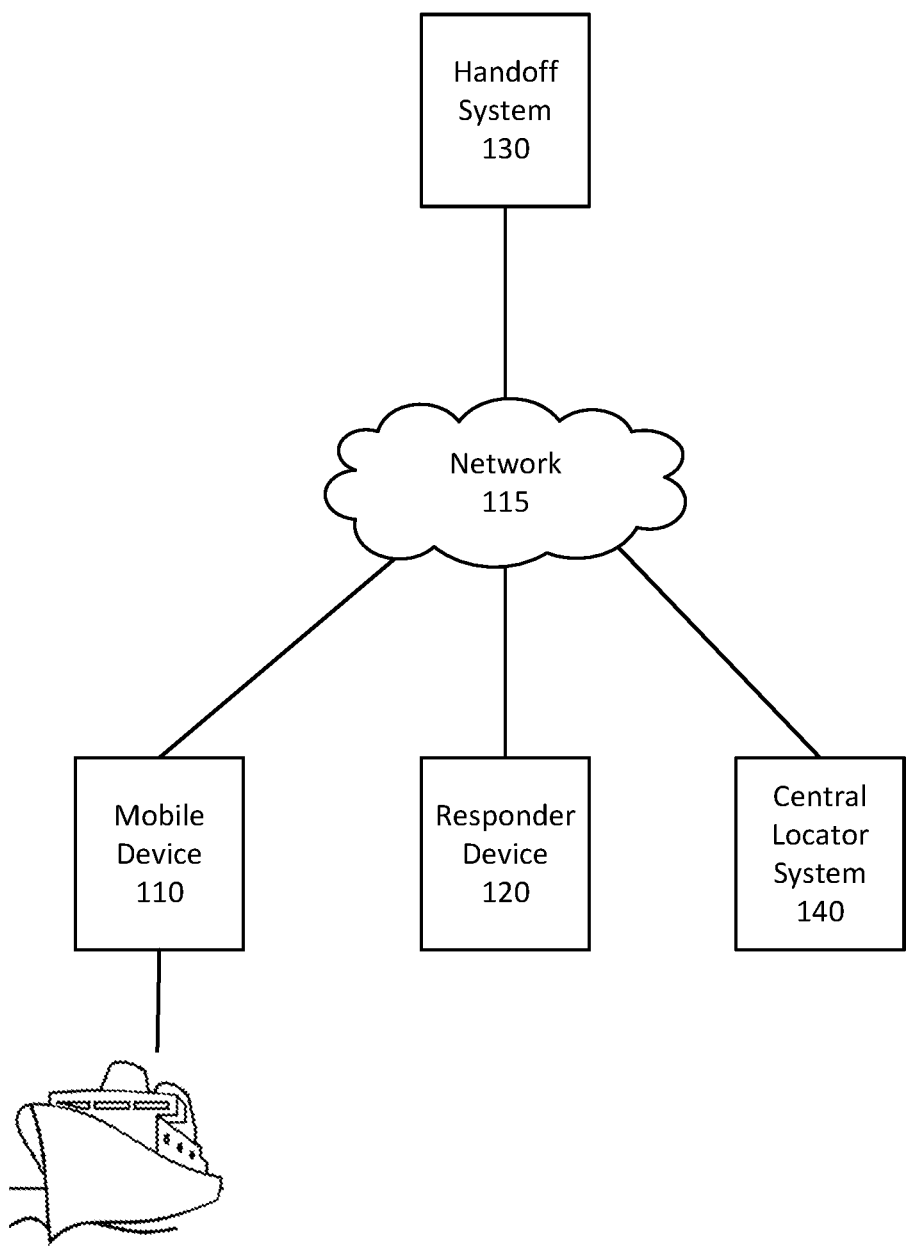
FIG. 1 illustrates one embodiment of a network environment for components of a handoff system.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. The term "real-time" in the text is used merely for convenience, and could encompass substantially real-time (i.e., within a threshold amount of time of the event occurring). One skilled in the art will readily recognize from the following description that alternative embodiments of the structures and methods illustrated herein may be employed without departing from the principles described herein.

Configuration Overview

Systems and methods are disclosed herein for seamlessly tracking a location of a ship approaching shore using mobile data in conjunction with GPS data to improve location accuracy. If the ship has a mobile device capable of determining and transmitting location information, the GPS data can be supplemented by real-time mobile data that is more frequent than GPS data. This improves location tracking, for example, where a water vessel is moving at high speed where infrequent satellite data is insufficient to follow movement of the vessel. Responsive to determining the boat is approaching shore using GPS data (e.g., last GPS ping occurs twenty-one miles from shore, indicating boat is approaching last twenty miles), the systems and method may begin scanning for a mobile signal in the proximity of the GPS ping and use a detected mobile signal to supplement the GPS tracking. The monitoring for the mobile signal responsive to determining the mobile signal is in the proximity of the GPS ping can limit the area and time in which the monitoring takes place, which can save on processing in comparison to systems or methods that continuously/periodically scan large areas of the shore for mobile signals.

One embodiment of a disclosed system, method and computer readable storage medium includes seamlessly tracking a location of a water vessel by supplementing satellite data with mobile data location based on proximity of a water vessel to shore. The system receives a Global Positioning System (GPS) location of the water vessel, the GPS location of the water vessel based on using the satellite data of the water vessel. The system determines that the GPS location is within a threshold distance of a boundary. Responsive to determining that the GPS location is within the threshold distance of the boundary, the system initiates monitoring for a mobile signal emanating from a trajectory path of the water vessel. The system detects, during the monitoring, the mobile signal, the tracking the location of the water vessel based on mobile data of the mobile signal. The system provides the tracked location to a monitoring device.

Handoff System Environment

Figure (FIG. 1 illustrates one embodiment of a network environment for components of a handoff system. Environment 100 includes mobile device 110, network 115, responder device 120, handoff system 130, and central locator system 140. The mobile device 110 and responder device 120 may be referred to as client devices. Though there is only one client device of each type, mobile device 110 and responder device 120 shown in FIG. 1, other embodiments may use a different number of client devices of either type. For example, while there is only one mobile device 110 shown associated with the water vessel, there may be multiple mobile devices associated with the water vessel (e.g., a dedicated device for the water vessel, other mobile devices associated with passengers of the water vessel, etc.), or other mobile devices associated with other water vessels, etc. While not depicted, additional client devices may be included in environment 100 and may be used by third party entities. In some cases, these additional client device may be referred to as monitoring devices. A monitoring device is a client device of parties interested in receiving information on a water vessel. A responder device 120 may be referred to as a monitoring device. However, other parties may be interested in receiving information on a water vessel such as for commercial or personal reasons (e.g., a shipping company, customers of a shipping company, or friends or family of a mariner on a water vessel). Monitoring devices may be operated on land, another water vessel, or any other location. For example, an employee of a shipping company interested in tracking a location of the water vessel may be operating a monitoring device in a company building, and friends or family of a mariner interested in tracking a location of the mariner may be operating a monitoring device at home or other land locations, on shore, or another water vessel. These various components are now described in additional detail.

Mobile device 110 is a client device on a water vessel. The mobile device 110 is capable of connecting to a mobile network. Even though one mobile device 110 is shown in FIG. 1, there may be more than one mobile device. The mobile device 110 may be a device carried by a mariner or passenger on a water vessel, and there may be more than one mobile device 110 on a water vessel. The mobile device 110 may be a dedicated device on a water vessel. A water vessel may have different types of mobile devices, such as a dedicated device and devices carried by passengers of the water vessel. The mobile device 110 can perform the functionality described herein. A water vessel refers to any vehicle used in water capable of transporting one or more persons. A water vessel may have built-in GPS capabilities and may be registered with a central locator system 140. A water vessel may be engine powered (e.g., motorboat), may be propelled partly or entirely by sails (e.g., sailboat), or unpowered or man-powered (e.g., raft, kayak, etc.).

Responder device 120 is a client device associated with a responder unit. A responder unit refers to an organized group of persons (e.g., first responders trained to respond to an emergency) which services a particular area (e.g., different coast guard stations). The responder device 120 may be a device carried by a responder of a responder unit. The responder device 120 may be a device that is operated by a dispatcher at a headquarters of a responder unit. Even though only one responder device 120 is shown in FIG. 1, there may be more than one responder device. For example, a responder unit may have multiple responder devices, such as a device at the headquarters of the responder unit, and devices carried by responders of the responder unit. The responder device 120 can perform the functionality described herein.

The term client device refers to a computing device such as a mobile phone (e.g., cellular phone, smartphone), tablet, laptop, computer, an Internet of Things (IoT) device, Very High Frequency (VHF) radio, a Standard Horizon radio, or any other device that can interact with the handoff system 130 over network 115 consistent with the interactions described herein for the type of the client device.

In some embodiments, a mobile device 110 may be a VHF radio that is modified to be Subscriber Identity Module (SIM) based (e.g., capable of connecting to mobile network). The VHF radio may have a GPS chip, and use digital selective calling (DSC) for transmitting distress signals, which can transmit a Maritime Mobile Service Identity (MMSI) of the water vessel and location coordinates of the water vessel. The VHF radio may be connected (e.g., hard wired or plugged into) to a power supply of the water vessel, and may more frequently transmit location coordinates (e.g., transmit mobile data in real-time or near real-time) and may periodically transmit GPS data (e.g., every 15 minutes).

In some embodiments, a mobile device 110 may be an IoT device that is SIM based. The IoT device may include a cellular modem and a GPS chip. The IoT device may be a standalone device, or embedded in some existing product. The IoT device may be connected to a power supply of the water vessel, and may more frequently transmit location coordinates (e.g., transmit mobile data in real-time or near real-time) and may periodically transmit GPS data (e.g., every 15 minutes).

In some embodiments, the mobile device 110 includes a processor (e.g., development board with a microprocessor), a cellular modem, and a GPS chip. The mobile device 110 may connected to a power supply of the water vessel, or have an independent power supply (e.g., be battery powered, solar powered, etc.). The mobile device 110 may include its own antenna, or be connected to an antenna of the water vessel.

The central locator system 140 is a system that tracks registered water vessels (e.g., ships). Registered water vessels are vessels that transmit location information along with information that identifies the vessel (e.g., a vessel identifier), where the identifying information is stored in a data structure (e.g., a mapping table that corresponds the vessel to its identifier). The ships that are registered with the central locator system 140 each have satellite tracking capabilities. Each ship provides updated location coordinates to the central locator 140 (e.g., by using satellite transmissions that may be scheduled, e.g., to be sent on a predefined timeline such as every fifteen minutes). The central locator system 140 interacts with the handoff system 130 over network 115.

Network 115 may be any suitable communications network for data transmission. In an embodiment such as that illustrated in FIG. 1, network 115 uses standard communications technologies and/or protocols and can include the Internet. In another embodiment, the entities use custom and/or dedicated data communications technologies. Network 115 connects mobile device 110, responder device 120 (or any number of client devices, in other embodiments), and the central locator system 140 to the handoff system 130 such that the mobile device 110, the responder device 120, the handoff system 130, and the central locator system 140 can transmit data back and forth.

Handoff system 130 facilitates activity relating to seamlessly tracking a location of a water vessel using satellite and mobile data. Further details relating to such activities are described throughout with reference to FIGS. 2-8 below.

Handoff System Configuration

Figure 2:
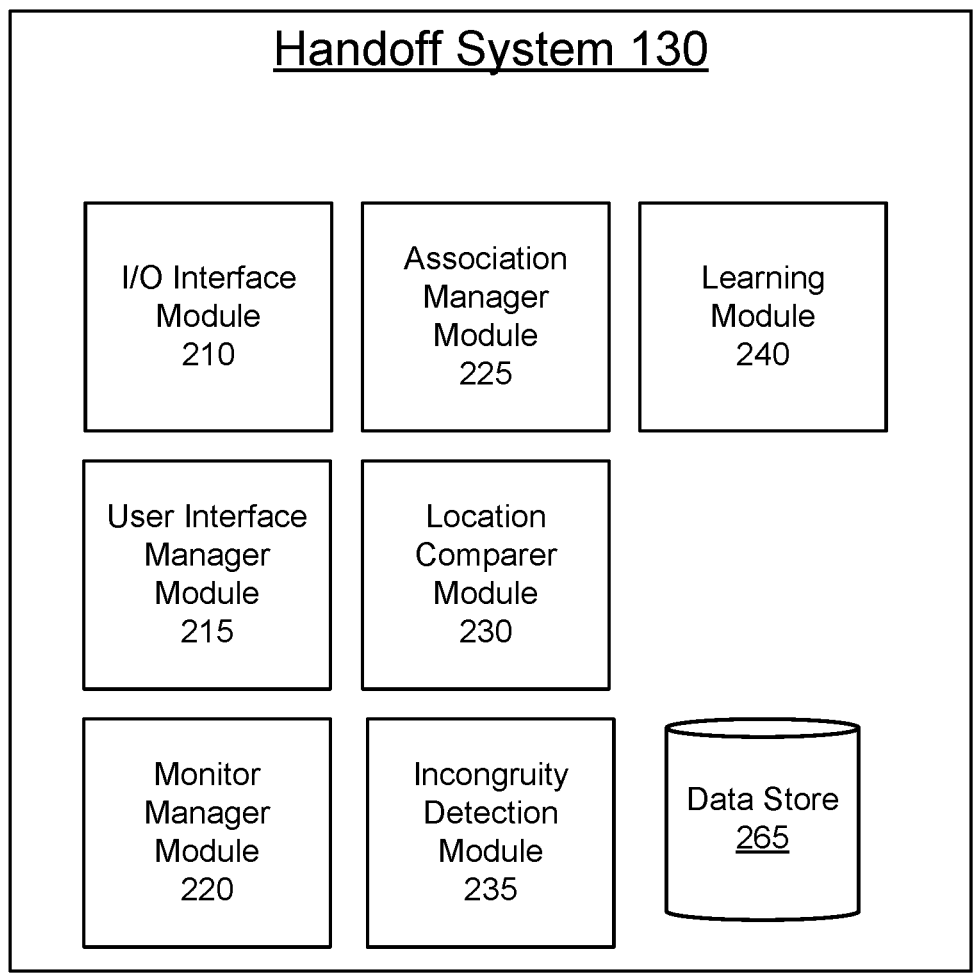
FIG. 2 illustrates one embodiment of modules and a database used by a handoff system.

FIG. 2 illustrates one embodiment of modules and a database used by a handoff system. Handoff system 130 includes I/O interface module 210, the user interface manager module 215, monitor manager module 220, association manager module 225, location comparer module 230, incongruity detection module 235, learning module 240, and data store 265. The modules and databases depicted with respect to handoff system 130 are merely exemplary; fewer or more modules or databases may be used to effect the processes described herein.

The I/O (input/output) interface module 210 interfaces with the network to communicate with the mobile device 110, the responder device 120, and the central locator system 140. The I/O interface module 210 may transmit information to and receive information from the client devices and the central locator system 140. The information may be a Short Message Service (SMS) message, a plurality of location coordinates, a web page, or any other information communicated from or to any device or system shown in FIG. 1 consistent with this disclosure. In one example, the I/O interface module 210 may receive GPS location coordinates of the water vessel from the central locator system 140 and additional information of the water vessel from the central locator system 140. The additional information of the water vessel may include an identifier of a mobile device associated with water vessel, phone numbers of a captain/crew members and/or passengers assigned to the ship, and information about a scheduled destination of the ship. The I/O interface module 210 may receive location coordinates of a mobile device 110 on a water vessel. The I/O interface module 210 may transmit a web page or SMS message to the client devices. The I/O interface module 210 may transmit a downloadable application to be installed on the client devices.

The user interface manager module 215 generates information for display on a client device. The information may be information in an SMS message for display on a mobile device 110 or responder device 120, or a web page (e.g., FIG. 8) for display a responder device 120. The information may be information for display in an application to a client device. The application may be installed on any client device, and may be downloadable from the handoff system 130 or the central locator system 140. In some embodiments, a third party interested in tracking information may download an application from the handoff system 130. In some embodiments, a responder device 120 may download an application from a central locator system 140 to display information based on satellite data, and may incorporate information from the handoff system 130 to display information based on mobile data for display on the client device. In some embodiments, a responder device 120 may download an application from the handoff system 130 to display information based on mobile and/or satellite data, and the application may incorporate information from the central locator system 140 to display on the client device.

The information displayed to a responder device 120 may include zones in which the water vessel may or mariner on the water vessel may be located. For example, a zone in which a water vessel may be located may include a pinpoint location of the water vessel and an uncertainty radius. The uncertainty radius may be included as a visual representation around the pinpoint location, or indicated as a description in a text box. A zone may be a mobile range of one or more cell towers indicating where a mobile signal may be transmitted and received (e.g., within certain distance of cell tower or within 20 miles of land). The information displayed to a responder device 120 may be represented as a map with a latest location of the mobile device 110 marked on the map. The user interface may also include information on the latest location of the mobile device 110 in a format of Latitude/Longitude, Degrees/Minutes/Seconds (DMS), Decimal Degree Minutes (DDM), an uncertainty radius, and information regarding a Date/Time stamp indicating locations as they are received by the handoff system 130. In some embodiments, the mobile device 110 may be a mobile phone of a user of a water vessel, and the user interface may include a phone status of the user (e.g., did user tap link to share location, is the user's mobile browser open, etc.).

The information displayed to a responder device 120 may include locations of multiple mobile devices and alerts. For example, the water vessel may have a mobile device that is a dedicated device transmitting location coordinates (e.g., satellite and/or mobile data), as well as one or more mobile devices carried onto the water vessel by passengers. In this scenario, the user interface to the responder device 120 may display location information of the water vessel as the dedicated device along with location information of the mobile devices associated with the water vessel. If a location of one or more of the mobile devices diverges from the dedicated device of the water vessel, the information displayed to the responder device 120 may include alerts to the responder. The divergence in location may indicate suspicious activity occurring near the water vessel, such as a person leaving a water vessel (e.g., registered cargo ship) in a smaller water vessel (e.g., unregistered boat) to smuggle in contraband. Identifying suspicious events and sending alerts to responder device 120 helps responders in ensuring safe and lawful commerce. The divergence in location of the mobile device to the dedicated device of the water vessel may indicate a passenger of the water vessel is in need of rescue (e.g., fallen off the ship, stranded in the water, etc.). Identifying such an event may benefit responders in performing a rescuing a distressed mariner.

The information displayed to a responder device 120 may include an alert indicating that satellite data of the water vessel has not been updated and include updated location coordinates of a mobile device associated with the water vessel. The non-transmission of satellite data may indicate a suspicious event, such as the water vessel being hijacked or having equipment failure, etc., and that the water vessel requires assistance. Alerting the responder to the non-transmission of satellite data with updated location of the water vessel based on mobile data may benefit responders in assisting the water vessel, rescuing passengers on the water vessel, or curtailing crime.

The information displayed to a responder device 120 may include an alert indicating a speed of a water vessel exceeds a threshold speed. In some embodiments, the water vessel may be a commercial vessel which is associated with a threshold speed indicating a boundary of a safe speed for the commercial vessel (e.g., larger vessels may have a lower threshold speed for safe travel, in comparison to smaller vessels which can have a higher threshold speed). A commercial vessel exceeding the threshold speed may raise safety issues near shore, and may indicate the commercial vessel is in trouble (e.g., malfunctioning or hijacked). A speed of the water vessel may be determined from location coordinates transmitted from the mobile device 110. If the speed of the water vessel exceeds a threshold speed, transmitting an alert to the responder device 120 to such an event may benefit a responder in addressing safety issues or curtailing crime.

The information displayed to a responder device 120 may include an alert indicating a recreational water vessel is in a zone of interest. For example, a mobile device 110 of an unregistered water vessel may be in a mobile range (e.g., within 20 miles of shore) or in proximity to a zone in which a registered water vessel is located. The information displayed to the responder device 120 may alert the responder that there is a recreational vessel near shore or nearby a commercial water vessel. The mobile device 110 may be determined to be associated with a recreational vessel based on speed (e.g., determined from location coordinates of the mobile device 110, inferring a speed greater than a threshold speed of a commercial vessel is a recreational vessel). Alerting the responder to the existence of recreational vessels in a zone (e.g., area near a water vessel, mobile zone, shipping channel, etc.) can fix a blind spot for rescue agencies (e.g., water vessels which do not report location coordinates via satellite tracking mechanisms) and address potential safety issues.

The information displayed to a responder device 120 may include locations of multiple water vessels based on multiple mobile devices 110. The water vessels may further be updated with a label indicating which water vessel is a registered water vessel based on subsequently receiving satellite data that matches a location of at least one of the mobile devices 110. Responsive to receiving satellite data confirming a location of the registered water vessel, other water vessels (e.g., location of mobile devices 110) may be labeled to indicate the water vessels are recreational vessels or suspicious vessels.

The information displayed to a client device may be data that is of interest to a third party. For example, information from cargo ships may be valuable to commercial entities. The commercial entity may want to know the location of the cargo ship to track a particular package on the cargo ship. The commercial entity may want to provide customers with tracking updates about their packages, such as arrival time on shore, estimated time to arrive on shore, etc. The commercial entity may want to know tracking information of the cargo ship to improve efficiencies of operations.

In some embodiments, the information displayed to a client device may be a suggested route of the water vessel or safety information. For example, the client device may be a mobile device 110 on the water vessel, and the information displayed on the mobile device 110 may be a safer course for the water vessel to take to reach a destination based on weather pattern or environmental factors. The information displayed on the mobile device 110 may be a safety alert regarding location of speeding water vessels or a location of suspicious vessels or activity to avoid. In another example, there may be multiple client devices, such as a mobile device for each recreational water vessel of mariners who would like to meet up at a common destination on water. The information displayed on the mobile device 110 may include a suggested route for each the mariner to take to a meeting location, and a visual representation of the respective locations. The client device may be a mobile phone, a user of the mobile phone downloading an application from the handoff system 130 to display a suggested route of the water vessel.

The monitor manager module 220 schedules and monitors for a mobile signal in a particular area. The monitor manager module 220 determines if received GPS coordinates of the water vessel is within a threshold distance from a boundary. The boundary indicates a detectable mobile range (e.g., twenty miles from shore), and the threshold distance indicates where the monitoring should begin (e.g., within one mile of the boundary, or twenty-one miles away from shore). Responsive to determining that the GPS location is within the threshold distance of the boundary, the monitor manager module 220 initiates monitoring for a mobile signal emanating from a trajectory path of the water vessel. In one embodiment, the monitor manager module 220 dynamically determines the threshold distance. For example, the monitor manager module 220 may determine the threshold distance to be a distance the water vessel is traveling in the interval between receiving satellite data (e.g., a water vessel travels 25 miles in 15 minutes, a time between satellite pings). Continuing with the example, the monitor manager module 220 may set the threshold distance to be 25 miles of the boundary (e.g., 45 miles of shore) as the water vessel would be within near-shore range (e.g., 20 miles of shore) within 15 minutes. If the received GPS coordinate of the water vessel is within 45 miles of shore, then the monitor manager module 220 begins to monitor for a mobile signal. The monitor manager module 220 may monitor for a mobile signal in a region including a trajectory path of the water vessel. The region may be defined as a threshold distance from the trajectory path of the water vessel. In one example, the monitor manager module 220 may determine the trajectory path from the latest-received GPS coordinates of the water vessel and the destination of the water vessel at the scheduled time. The monitor manager module 220 may determine the trajectory path of the water vessel based on previously received GPS coordinates (e.g., estimate a direction and speed of the water vessel). For example, the monitor manager module 220 may determine the trajectory path by determining a speed and a direction of the water vessel from the location coordinates (e.g., received GPS coordinates) and computing an estimated distance traveled (speed x elapsed time from last-received location coordinate) in the determined direction. The speed and the direction of the water vessel may also be based on one or more environmental factors such as a current (water) speed and direction measurement or a wind speed and direction measurement. For example, the water vessel may drift due to the water current and wind, and an estimated speed of the water vessel may be based on measured current speed/direction and a measured wind speed/direction. The monitor manager module 220 may input the location coordinates and/or the one or more environmental factors into a machine learning model and receive an estimated location of the water vessel as an output from the machine learning module. The machine learning model may be trained using historical data collected by the handoff system 130. For example, the handoff system 130 may have access to historical data due to previous tracking efforts, rescue efforts, of received location information from client devices, additional location information, environmental factors, and actual location of mobile devices after a responder has reached the water vessel. This information can be used to train the machine learning model to output a probability that the mobile device 110 is at each of a set of several coordinates (or within a range or radius of a given coordinate). The machine learning module may be used by the monitor manager module 220 to generate a projected location based on inputs such as a plurality of location coordinates from the mobile device 110, other additional location information, and one or more environmental factors. For example, the output of the machine learning module may be a probability that the mobile device 110 is at each of a set of several location coordinates, and the monitor manager module 220 may use this output to determine an estimated location and an uncertainty radius which indicates a field that the mariner is likely within. The monitor manager module 220 may select an estimated location coordinate from the set of several location coordinates, the estimated location coordinate having the highest probability among the set, and determine an uncertainty radius based on the corresponding probability (e.g., lower probability would correspond to a higher uncertainty radius). The monitor manager module 220 may determine the trajectory path using the estimated location coordinate as part of the trajectory path of the water vessel. If the water vessel changes its path and begins to travel away from shore, responsive to the water vessel being outside the threshold distance of the boundary (e.g., greater than twenty-one miles), the monitor manager module 220 may stop monitoring for the mobile signal.

In one embodiment, the monitor manager module 220 may initiate communications with a registered mobile device of the water vessel to request location sharing. The registered mobile device may be a dedicated device (e.g., VHF radio, IoT device, or other device modified to connect to mobile network) or may be some other type of device such as a mobile phone of a captain or crew of the ship. In one example, if the monitor manager module 220 does not detect a mobile signal during the monitoring, the handoff system 130 may send an SMS message to a mobile phone number associated with a captain of the registered ship requesting the captain to share a location of his mobile phone.

The association manager module 225 associates a mobile device 110 with a water vessel. The association manager module 225 identifies a mobile device 110 that transmitted the detected mobile signal (e.g., a device identifier for an IoT device with mobile capabilities and/or a phone number of a mobile phone) during the monitoring. The association manager module 225 determines whether the mobile device 110 is associated with the water vessel.

In one embodiment, the mobile device 110 may be registered with the central locator system 140 as corresponding to the water vessel, and the association manager module 225 determines whether the mobile device 110 is associated with the water vessel based on received information from the central locator system 140. For example, if the identifying information for a mobile device 110 (e.g., device identifier and/or phone number) matches registered information for the water vessel, the association manager module 225 determines the mobile device 110 is associated with the water vessel. Responsive to determining the mobile device 110 is associated with the water vessel, the association manager module 225 may store the association in data store 265.

In some embodiments, the information from the central locator system 140 may not indicate an association between the mobile device 110 and the water vessel, and the association manager module 225 determines whether the mobile device 110 is associated with the water vessel based on the mobile device 110 being in a proximity of the water vessel using the location comparer module 230. Responsive to determining the mobile device 110 is in the proximity of the water vessel, the association manager model 225 infers that the mobile device 110 is associated with the water vessel. Responsive to determining the mobile device 110 is associated with the water vessel, the association manager module 225 may store the association in data store 265.

In some embodiments, the monitor manager module 220 may identify multiple mobile signals transmitted by multiple mobile devices, and the association manager module 225 may determine which ones are associated with the water vessel. The association manger module 225 may base the determination on comparing a subsequently received satellite data from the water vessel to the location of each mobile devices. Responsive to determining a location of a mobile device 110 matches a location of the water vessel (e.g., received satellite data including GPS coordinates) the association manager module 225 may associate the mobile device 110 with the water vessel. The association manager module 225 may associate the other mobile devices with a label to indicate the water vessels are recreational vessels or suspicious vessels. The association of the other mobile devices and corresponding label indicating a recreational vessel or a suspicious vessel may be stored in the data store 265.

The location comparer module 230 determines whether the mobile device 110 is within a proximity threshold distance of a location of the water vessel. In one embodiment, the location of the water vessel is the last-received GPS location coordinates of the water vessel. The location comparer module 230 may adjust the proximity threshold distance of the location of the water vessel to be larger if there is a greater the difference in timestamp of the last-received GPS location coordinates of the water vessel and the received location coordinates of the mobile device 110 (e.g., a few seconds delay would have a smaller proximity threshold distance than a few minutes delay). In one embodiment, the location comparer module 230 may determine an estimated location of the water vessel at a time location coordinates of the mobile device 110 was received. The estimated location of the water vessel may be based on the last-received GPS coordinates and a scheduled destination of the water vessel. The estimated location of the water vessel may be based on the previously received GPS coordinates (e.g., indicating speed and direction of the water vessel). The location comparer module 230 may compare the estimated location of the water vessel to the received location coordinates from the mobile device 110 to determine whether the mobile device 110 is within a proximity threshold distance of the water vessel. The location comparer module 230 may determine an estimated location of the water vessel based on environmental factors and the previously received GPS coordinates (e.g., indicating speed and direction of the water vessel). Environmental factors may include measured data of the environment surrounding the mobile device 110 such as wind or current speed and direction which could affect the motion of a water vessel.

For example, the water vessel may drift due to the water current and wind, and an estimated speed of the water vessel may be based on measured current speed/direction and a measured wind speed/direction.

A responder may want to receive alerts which include information regarding a water vessel that is deviating from its estimated trajectory. Such information may be useful to a responder as it may indicate a situation which requires immediate attention. For example, a deviation in the trajectory of a water vessel to a scheduled location may indicate that the water vessel has been hijacked by others, or that there is equipment malfunction causing the water vessel to veer off course. Receiving an alert with this information can give more time to responders to react to search and rescue situations, as well as enabling responders to alert other water vessels in proximity to a water vessel in distress of potential problems to improve safety.

The incongruity detection module 235 determines whether there is an incongruity in a tracked location of the water vessel based on mobile data from a mobile device 110 associated with the water vessel and an estimated trajectory of the water vessel based on satellite data, environmental factors, scheduled destination of the water vessel, or any combination thereof. For example, the estimated trajectory of the water vessel may be based on the last-received GPS coordinates of the water vessel and a scheduled destination of the water vessel. Responsive to determining that the tracked trajectory of the water vessel deviates by a trajectory threshold distance from the estimated trajectory, the handoff system 130 sends an alert to a responder device 120 which indicates the new trajectory of the mobile device 110. The incongruity detection module 235 may select a responder device 120 from a plurality of responder devices based on a location of the responder device 120 to the incongruity. For example, the handoff system 130 may select a responder device 120 that is closest to a location (e.g., known or estimated) to a suspicious event or water vessel, and send an alert to the selected responder device 120.

In one embodiment, the incongruity detection module 235 may determine that the location of a mobile device 110 associated with the water vessel (e.g., dedicated device of the water vessel or mobile device carried onto the water vessel by a passenger) deviates from an estimated trajectory of the water vessel (e.g., based on a scheduled destination of the water vessel from the central locator system 140). For example, a ship may malfunction or be hijacked and veer off course from an expected destination. The incongruity detection module 235 may trigger the handoff system 130 to send an alert to the responder device 120 regarding the unexpected event, which is detected in real-time, or near real-time, giving the responder the most up-to-date information and more time to react to the situation than in the case of relying on satellite data.

In one embodiment, the incongruity detection module 235 may determine that the location of a mobile device 110 associated with the water vessel (e.g., mobile device carried onto the water vessel by a passenger) deviates from the estimated trajectory of the water vessel (e.g., based on satellite data or transmissions from a dedicated device on water vessel). This deviation indicates the mobile device 110 has separated from the course of the water vessel. For example, a passenger with a mobile device may leave the ship on a smaller vessel as it nears shore to smuggle contraband, or a passenger with a mobile device may have fallen off the ship. The incongruity detection module 235 may trigger the handoff system 130 to send an alert to the responder device 120 regarding the unexpected event and indicate the new location of the mobile device 110 as being separated from the tracked location of the water vessel.

In one embodiment, the incongruity detection module 235 may determine that satellite data of the water vessel has not been updated, but the mobile data from a mobile device 110 associated with the water vessel has been updated. The incongruity detection module 235 may determine that more than a threshold time has passed since the last satellite data update. The threshold time may be based on a frequency of receiving satellite data (e.g., if receiving GPS location information once every 15 minutes, set threshold time to be greater or equal to fifteen minutes). The non-transmission of satellite data may indicate a suspicious event, such as the water vessel being hijacked or having equipment failure, etc., and that the water vessel requires assistance. The incongruity detection module 235 may trigger the handoff system 130 to send an alert to the responder device 120 regarding the non-transmission of satellite data with an updated location of the water vessel based on mobile data.

In one embodiment, the incongruity detection module 235 may determine a speed of a water vessel exceeds a threshold speed. The water vessel may be a commercial vessel which is associated with a threshold speed indicating a boundary of a safe speed for the commercial vessel (e.g., larger vessels may have a lower threshold speed for safe travel, in comparison to smaller vessels which can have a higher threshold speed). The incongruity detection module 235 may determine a speed of the water vessel from location coordinates transmitted from the mobile device 110. If the speed of the water vessel exceeds a threshold speed, the incongruity detection module 235 may trigger the handoff system 130 to transmit an alert to the responder device 120 including information of the speeding event.

In one embodiment, the incongruity detection module 235 may determine a recreational water vessel is in a zone of interest. The incongruity detection module 235 may identify a mobile signal from a mobile device 110, and determine the mobile device 110 is a recreational vessel based on speed (e.g., determined from location coordinates of the mobile device 110, inferring a speed greater than a threshold speed of a commercial vessel is a recreational vessel). In another embodiment, responsive to receiving satellite data confirming a location of a registered water vessel, the incongruity detection module 235 may identify locations of other mobile devices in proximity to the water vessel but not matching the location of the registered water vessel to be recreational vessels or suspicious vessels. The incongruity detection module 235 may trigger the handoff system 130 to transmit an alert regarding the existence of recreational vessels in a zone (e.g., area near a water vessel, mobile zone, shipping channel, etc.) which can fix a blind spot for rescue agencies (e.g., water vessels which do not report location coordinates via satellite tracking mechanisms) and address potential safety issues.

In one embodiment, the incongruity detection module 235 may identify a mobile signal indicating a location of a mobile device transmitting the mobile signal is not in proximity to any registered water vessel (e.g., greater than a threshold proximity from a location or estimated trajectory of a registered water vessel). For example, persons on an unregistered water vessel may be following a water vessel or waiting to attack a water vessel for illegal purposes. The incongruity detection module 235 infers that a mobile device associated with the mobile signal is suspicious as its location does not match any registered water vessel, and estimates a location and trajectory based on received mobile data. The incongruity detection module 235 may trigger the handoff system 130 to transmit an alert to a responder device 120 including information indicating a location, estimated location, or estimated trajectory of a suspicious water vessel.

The learning module 240 gathers historical data such as tracking data of water vessels based on received GPS and mobile data, additional information from the registry about the water vessels (e.g., scheduled destination, type of ship, captain of the ship, etc.), and one or more environmental factors. The learning module 240 stores the historical data to the data store 265. The learning module 240 may use the gathered historical data to train a machine learning model to output a probability that a water vessel reach a destination within a fixed time using each of a set of several paths. In one embodiment, the handoff system 130 may suggest a path for the water vessel that is currently being tracked. The learning model 240 may input the tracked location, the scheduled location, and one or more environmental factors into the machine learning model. The learning module 240 may use the output of the machine learning model to determine a suggested path, the suggested path having the highest probability among the set of paths to be completed within a period of time. The handoff system 130 may transmit to the mobile device 110 the information corresponding to the suggested path. For example, a captain of the water vessel may use the suggested path to improve an efficiency of getting the water vessel to shore.

The data store 265 stores information used by the handoff system 130. The information may include an association between the mobile device 110 and a water vessel. The information may include historical data such as tracking data of water vessels based on received GPS and mobile data, additional information from the registry about the water vessels, and one or more environmental factors.

Figure 3:
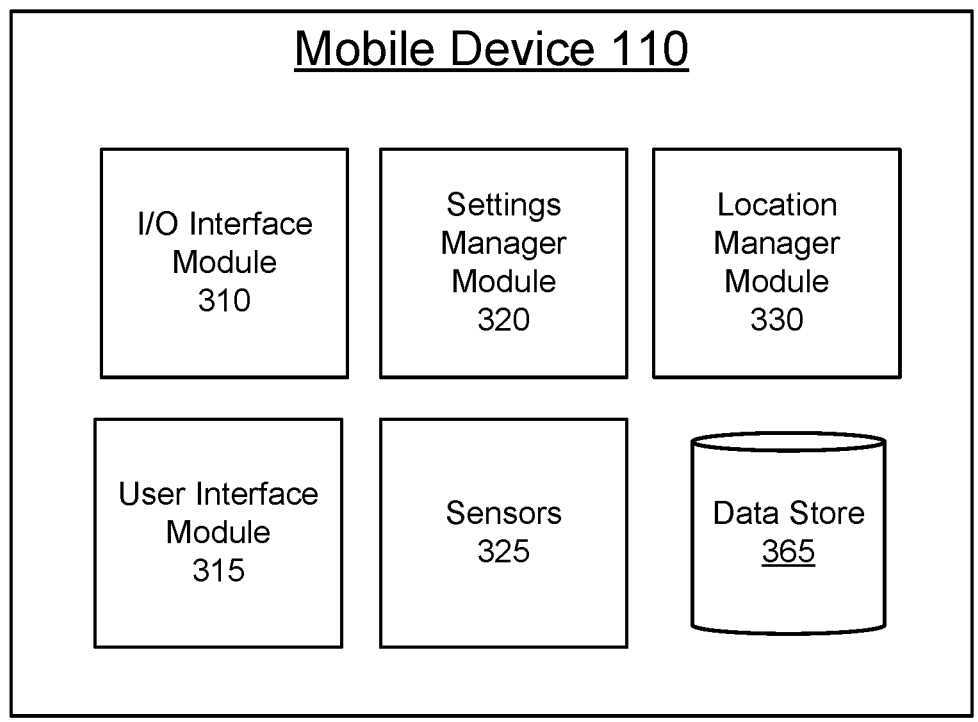
FIG. 3 illustrates one embodiment of modules and a database used by a mobile device.

FIG. 3 illustrates one embodiment of modules and database used by a mobile device. Mobile device 110 includes I/O interface module 310, the user interface manager module 315, settings manager module 320, sensors 325, location manager module 330, and data store 365. The modules and databases depicted with respect to mobile device 110 are merely exemplary; fewer or more modules or databases may be used to effect the processes described herein.

The I/O interface module 310 interfaces with the network 115 to communicate with the handoff system 130 and optionally the responder device 120 and central locator system 140. The I/O interface module 310 may download an application on the mobile device 110 from the handoff system 130. The I/O interface module 310 can transmit information to and receive information from the handoff system 130 and the responder device 120. The information may be a Short Message Service (SMS) message, a plurality of location coordinates from the mobile device 110, or a web page from the handoff system 130. As an example, mobile device 110 may be a dedicated device such as a mobile IoT device (IoT device with mobile capabilities) on the water vessel or a mobile phone of a user on the water vessel. The mobile IoT device may be coupled to the power supply of the water vessel (e.g., hardwired to or plugged into a power supply of the water vessel) or may be battery/solar powered. The I/O interface module 310 may transmit location coordinates from the mobile IoT device or mobile phone to the handoff system 130. The mobile IoT device or mobile phone may measure a variety of environmental data, and the I/O interface module 310 may transmit information on measured environmental data to the handoff system 130. The I/O interface module 310 may transmit identifying information such as a unique device identifier of the mobile IoT device or mobile phone, or a mobile phone number of a mobile phone.

The user interface manager module 315 generates information for display on the mobile device 110. The information may be information in an SMS message, a mobile web browser, or an application for display on a mobile device 110. In one example, the mobile device is a mobile phone, and the user interface manager module 315 displays an SMS message to the mobile phone. The SMS message may include a selectable link to share the location of the mobile device 110. The user interface manager module 315 may launch a mobile web browser in response to a user selecting the selectable link. The user may confirm sharing the location of the mobile phone by pressing a button on the web page of the mobile web browser. The SMS message may include information relevant to safety announcements (e.g., unauthorized water vessel identified in a shipping channel, disabled water vessel at a certain location, etc.). The SMS transmitted by the handoff system 130 may be initiated from a responder device 120 or the handoff system 130. In another example, the user interface manger module 315 may display a web page in a mobile web browser, or a user interface in an application, to help a user locate another user on another water vessel. The web page or user interface may include graphics of a current location of the water vessel in relation to location coordinates of another water vessel and a projected meeting location. The web page or user interface may include suggested routes based on environmental conditions.

The settings manager module 320 manages the settings for the mobile device 110. The settings manager module 320 may update a setting for the mobile device 110 to share location information responsive to a user selecting an option to share a location of the mobile device 110. The settings manager module 320 may enable a setting for the mobile device 110 to continually transmit location information, regardless of whether a confirmation response is received. The settings manager module 320 may enable a setting for the mobile device 110 to transmit location information responsive to the mobile device 110 determining a location of the mobile device 110 has changed (e.g., via the location manager 330). The settings manager module 320 may update a setting for the mobile device 110 to stop sharing location information responsive to a user selecting an option to stop sharing a location of the mobile device 110.

The sensors 325 detect at least one of motion, an environmental condition, position, or some combination thereof. The sensors 325 may include a motion sensor to detect motion, rotation, or acceleration. Examples of a motion sensor are an accelerometer, gravity sensor, gyroscope, or rotational vector sensors. The sensors 325 may include an environmental sensor to measure air pressure changes, humidity, temperature, etc. Examples of an environmental sensor are a barometer, photometer, or thermometer. The sensors 325 may include a position sensor such as a magnetometer to measure orientation of the device (e.g., true North). The mobile device 110 may transmit data captured by the sensors 325 (in addition to its location information) to the handoff system 130. The transmitted data captured from the sensors 325 can be used by the handoff system 130 as environmental factors.

The location manager module 330 determines a location of the mobile device 110. The location manager module 330 may determine a location of the mobile device 110 using any location mechanisms available to the mobile device 110 such as GPS, Assisted GPS (AGPS), Wi-Fi, and cellular location. The location manager module 330 may use a network infrastructure of the mobile device 110 to determine the location of the mobile device 110. For example, the mobile device 110 may be a mobile phone which sends signals to nearby cell towers that can be used to triangulate the location of the mobile phone. The location manager module 330 may use GPS to determine the location of the mobile device 110. For example, if a mobile phone is equipped with GPS it can connect with GPS satellites to determine its location. The location manager module 330 may also determine the location using information from the sensors 325.

The data store 365 stores information for the mobile device 110. This information may include a unique identifier and/or mobile phone number of the mobile device 110. This information may include device settings of the mobile device 110.

Figure 4:
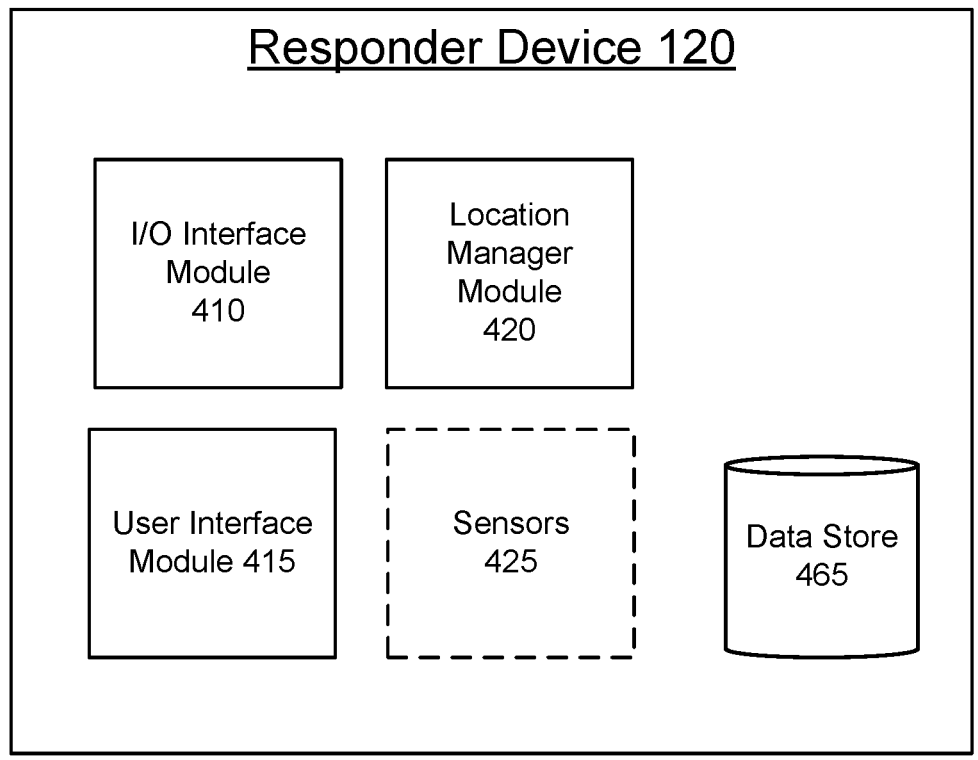
FIG. 4 illustrates one embodiment of modules and a database used by a responder device.

FIG. 4 illustrates one embodiment of modules and database used by a responder device. Responder device 120 includes I/O interface module 410, the user interface manager module 415, location manager module 420, sensors 425 (optional), and data store 465. The modules and databases depicted with respect to responder device 120 are merely exemplary; fewer or more modules or databases may be used to effect the processes described herein.

The I/O interface module 410 interfaces with the network 115 to communicate with the handoff system 130, optionally to communicate with the mobile device 110, and to communicate with the central locator system 140. The I/O interface module 410 may download an application on the mobile device 110 from the handoff system 130 or the central locator system 140. The I/O interface module 410 may transmit information to and receive information from the handoff system 130, optionally the mobile device 110, and the central locator system 140. The information may be a Short Message Service (SMS) message for display on the responder device 120. The information may be location coordinates of the mobile device 110, location coordinates of the water vessel from the central locator system 140, or location coordinates of the responder device 120. The information may be a web page (e.g., FIG. 8) to display on a browser or mobile browser the responder device 120 from the handoff system 130. The information may be a user interface to display in an application on the responder device 120. As an example, the responder device 120 may be a computer of a dispatcher in a responder unit or a mobile phone of a responder in a responder unit. The I/O interface module 410 may transmit information for the handoff system 130 to transmit to mobile devices 110. For example, the responder device 120 may want to alert mobile devices 110 of water vessels about safety information regarding a speeding boat or a location where suspicious activity is taking place so that water vessels can avoid such locations.

The user interface manager module 415 presents information on the responder device 120. The user interface module 415 may be similar to the user interface module 315 except it is for a responder device 120. The information may be information in an SMS message, a mobile web browser, or an application for display on a responder device 120. The responder device 120 may display information specific for responders that is not be available for a mobile device 110 of a water vessel. For example, the responder device 120 may receive information relevant for responders to ensure safety and lawful commerce. For example, a responder device 120 may include information such as location of recreational and commercial water vessels near shore, and alerts regarding speeding water vessels and suspicious events, etc. The information in an SMS message may include alerts with information specific for responders regarding activity such as tracking location of speeding water vessels, suspicious water vessels, mariners in distress, etc.

The location manager module 420 determines a location of the responder device 120. The location manager module 420 may be similar to the location manager module 330 of the mobile device 110 except it is for the responder device 120. The location of the responder device 120 may be transmitted to the handoff system 130, and used by the handoff system 130 to select a responder device 120 that is advantageously located to respond to a suspicious event or water vessel. For example, the handoff system 130 may select and send an alert to a responder device 120 closest to a known or estimated location to a suspicious event or water vessel.

The responder device 120 may include sensors 425. In one example, the responder device 120 is a mobile phone or dedicated device (e.g., VHF radio, IoT device, or other device modified to connect to mobile network) on a responder water vessel, the sensors 425 are similar to the sensors 325 of the mobile device 110 except they are for the responder device 120.

The data store 465 stores information for the responder device 120. In one example, the responder device 120 is a mobile phone, and the data store 465 is similar to the data store 365 of the mobile device 110 except it is storage for the responder device 120.

Figure 5:
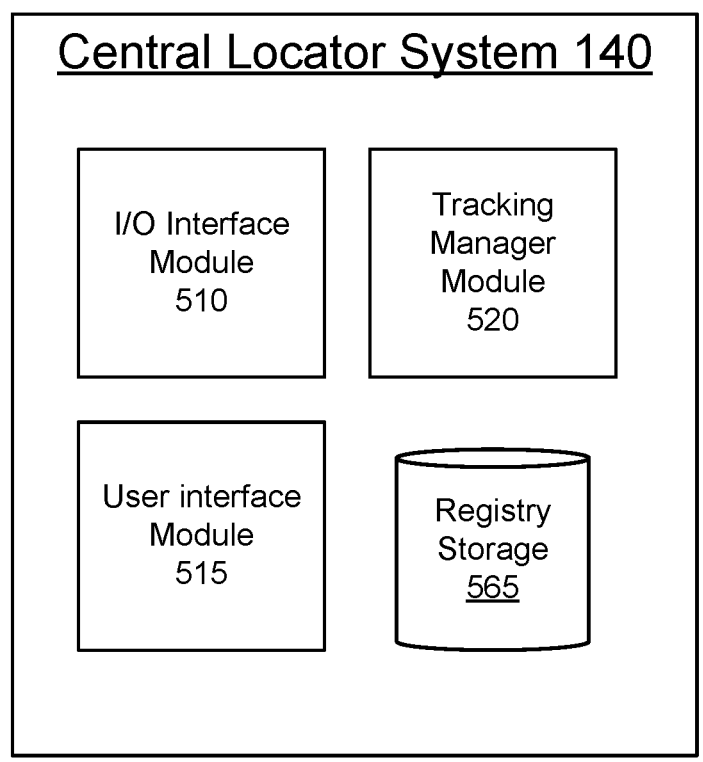
FIG. 5 illustrates one embodiment of modules and a database used by a central locator system.

FIG. 5 illustrates one embodiment of modules and a database used by a central locator system. Central locator system 140 includes an I/O interface module 510, a user interface module 515, a tracking manager module 520, and registry storage 565.

The I/O interface module 510 interfaces with the network 115 to communicate with the handoff system 130 and optionally the client devices. The I/O interface module 410 may transmit information to and receive information from the handoff system 130, the mobile device 110, and the responder device 120. The information may be information registered with the central locator system 140 regarding a water vessel, or tracking information of the water vessel such as GPS location coordinates of a registered water vessel from the central locator system 140. The central locator system 140 may receive information from the handoff system 130, such as include location coordinates based on mobile data from a mobile device 110 associated with a registered water vessel. The I/O interface module may transmit a downloadable application to be installed on the client devices.

The user interface module 515 generates information for display on a client device. The information may be included in a graphical user interface to display the location of the water vessel based on tracking information of the water vessel from the central locator system 140. The graphical user interface may also display the location of the water vessel based on mobile data from an associated mobile device 110.

The tracking manager module 520 tracks a location of a registered water vessel with the central locator system 140. The tracking manager module 520 updates a location of the registered water vessel responsive to receiving an updated GPS location transmitted from the registered water vessel. The tracking manager module 520 may store this information in registry storage 565.

The registry storage 565 stores information on registered water vessels. It may store a vessel identifier, information of the captain and crew on the water vessel including contact information (e.g., a mobile phone number) or unique identifiers of mobile devices of the users or dedicated device of the water vessel. The registry storage 565 may also store locations of the water vessel based on received GPS location coordinates of registered water vessel, or scheduled destination of the water vessel. The registry storage 565 may also store received location coordinates of the water vessel based on mobile data from an associated mobile device 110.

Computing Machine Architecture

Figure 6:
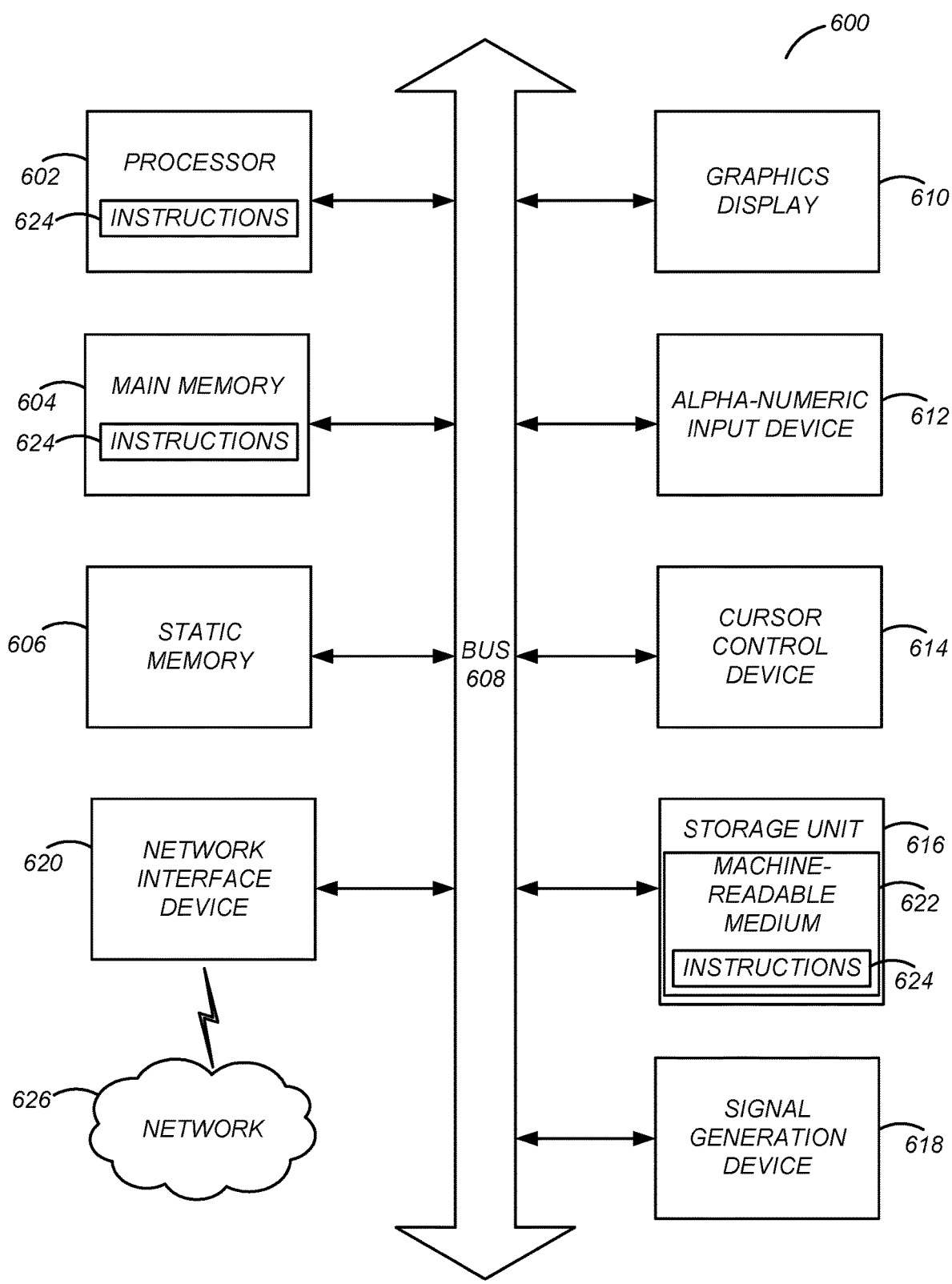
FIG. 6 is a block diagram illustrating components of an example machine able to read instructions from a machine-readable medium and execute them in a processor (or controller).

FIG. 6 is a block diagram illustrating components of an example machine able to read instructions from a machine-readable medium and execute them in a processor (or controller). Specifically, FIG. 6 shows a diagrammatic representation of a machine in the example form of a computer system 600 within which program code (e.g., software) for causing the machine to perform any one or more of the methodologies discussed herein may be executed. The program code may be comprised of instructions 624 executable by one or more processors 602. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 624 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 600 includes a processor 602 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 604, and a static memory 606, which are configured to communicate with each other via a bus 608. The computer system 600 may further include visual display interface 610. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 610 may include or may interface with a touch enabled screen. The computer system 600 may also include alphanumeric input device 612 (e.g., a keyboard or touch screen keyboard), a cursor control device 614 (e.g., a mouse, a trackball, a joystick, a motion sensor, or other pointing instrument), a storage unit 616, a signal generation device 618 (e.g., a speaker), and a network interface device 620, which also are configured to communicate via the bus 608.

The storage unit 616 includes a machine-readable medium 622 on which is stored instructions 624 (e.g., software) embodying any one or more of the methodologies or functions described herein. The instructions 624 (e.g., software) may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 (e.g., software) may be transmitted or received over a network 626 via the network interface device 620.

While machine-readable medium 622 is shown in an example embodiment to be a single medium, the term "machine-readable medium" should be taken to include a single medium or multiple media (e.g., a centralized or distributed database, or associated caches and servers) able to store instructions (e.g., instructions 624). The term "machine-readable medium" shall also be taken to include any medium that is capable of storing instructions (e.g., instructions 624) for execution by the machine and that cause the machine to perform any one or more of the methodologies disclosed herein. The term "machine-readable medium" includes, but not be limited to, data repositories in the form of solid-state memories, optical media, and magnetic media.

Example Use Case—Near Shore Tracking of a Water Vessel

The above-described components of the handoff system 130 enable a system to seamlessly track a location of a water vessel by supplementing satellite data with mobile data based on proximity of the water vessel to shore.

Figure 7:
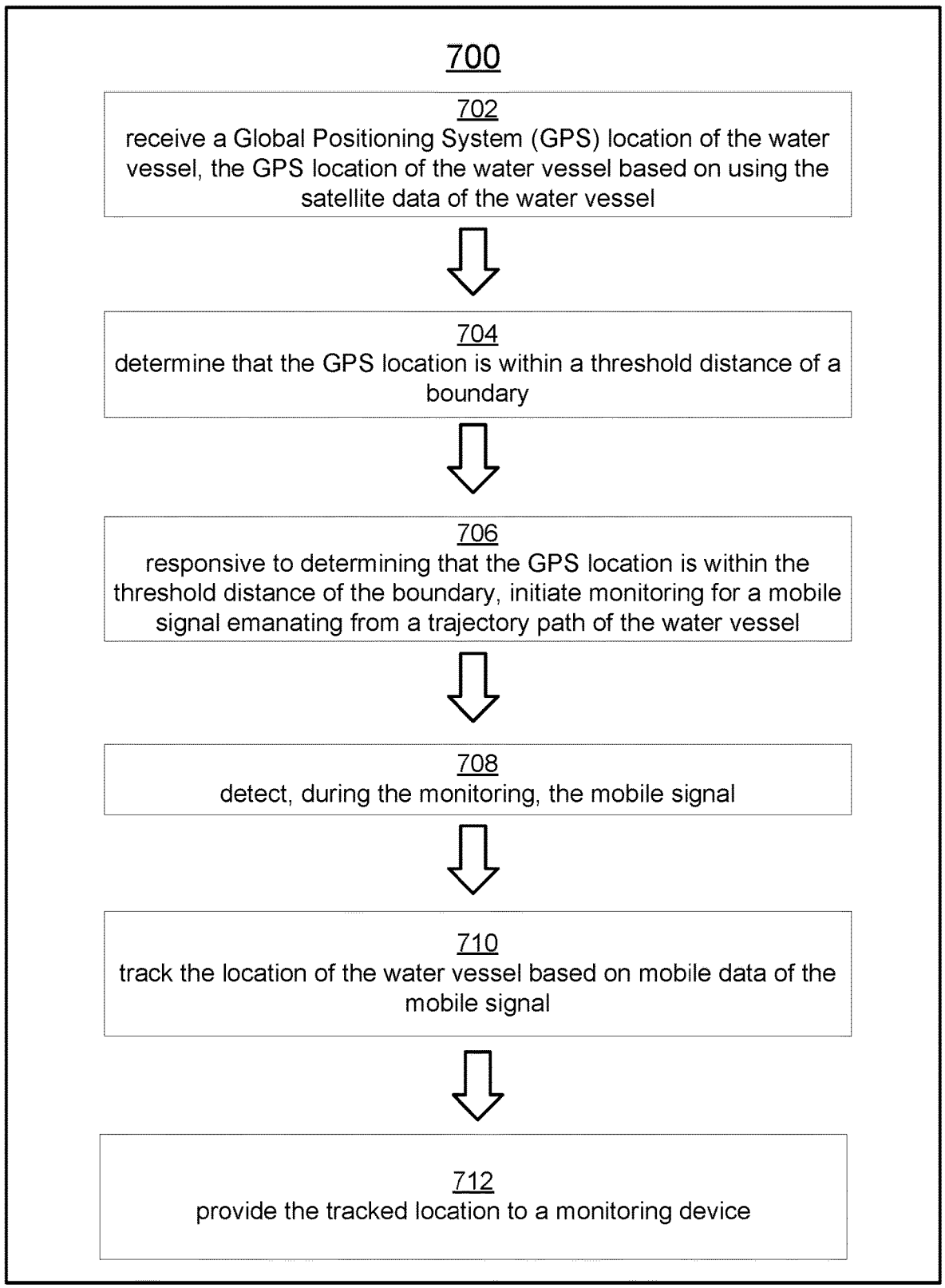
FIG. 7 depicts a process for enabling satellite to mobile handoff tracking of a water vessel, in accordance with an embodiment.

FIG. 7 depicts a process for seamlessly tracking a location of a water vessel by supplementing satellite data with mobile data based on proximity of a water vessel to shore, in accordance with an embodiment. Process 700 begins with handoff system 130 receiving 702 a Global Positioning System (GPS) location of the water vessel, the GPS location of the water vessel based on using the satellite data of the water vessel. The handoff system 130 may receive the GPS location of the water vessel via central locator system 140. Alternatively, handoff system 130 may receive the GPS location via a responder device 120 (e.g., responder device may receive via central locator system 140), or via a mobile device 110 on the water vessel.

The handoff system 130 determines 704 that the GPS location is within a threshold distance of a boundary. For example, the boundary may be a mobile range (e.g., twenty miles from shore), and a threshold distance may be a distance from the mobile range (e.g., one mile, twenty-one miles from shore). Responsive to determining that the GPS location is within the threshold distance of the boundary, the handoff system 130 initiates 706 monitoring for a mobile signal emanating from a trajectory path of the water vessel.

The handoff system 130 detects 708 during the monitoring, the mobile signal. For example, the mobile signal may be a from a mobile IoT on the water vessel, or from a mobile phone on the water vessel. The handoff system 130 tracks 710 the location of the water vessel based on mobile data of the mobile signal. The mobile data of the mobile signal may include location coordinates of a mobile device transmitting the mobile signal.

The handoff system 130 provides 712 the tracked location to a monitoring device. The monitoring device may be another mobile device on another boat (e.g., a friend wanting to know the location coordinates of the first boat to meet in the water). The monitoring device may be a mobile phone of a friend or family member requesting updates about the location of the mariner based on a phone number their mobile device 110. The monitoring device may be a responder device 120. The responder device 120 may be tracking a location of a water vessel in distress.

Example User Device Interface

Figure 8:
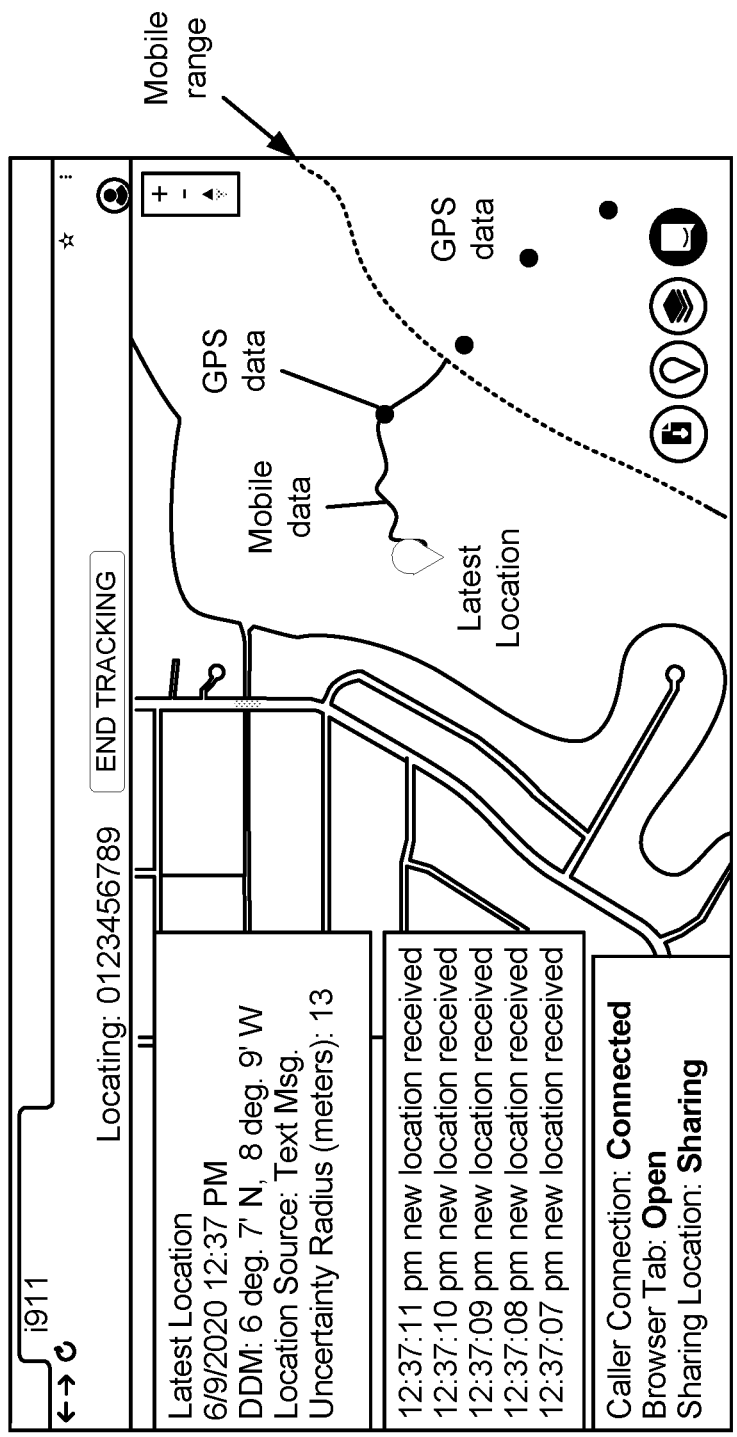
FIG. 8 depicts a user interface on a responder device, in accordance with an embodiment.

FIG. 8 depicts a user interface on the responder device, in accordance with an embodiment. The user interface may be a web browser of the responder device 120 which displays a web page of the handoff system 130. The user interface on the responder device 120 includes a map with a latest location of the mobile device 110 marked on the map. The user interface may also include information on the latest location of the mobile device 110 in a format of Latitude/Longitude, Degrees/Minutes/Seconds (DMS), Decimal Degree Minutes (DDM), an uncertainty radius, and information regarding a Date/Time stamp indicating locations as they are received by the handoff system 130. In this embodiment, the mobile device is a mobile phone of a user of a water vessel, and the user interface includes a phone status of the user (e.g., did user tap link to share location, is the user's mobile browser open, etc.).

The handoff system 130 may transmit location coordinates from the mobile device 110 as they are received by the handoff system 130 to the responder device 120 to allow real-time update of the location of the mobile device 110 on its user interface. The handoff system 130 may enable the user interface of the responder device 120 to display previously transmitted location coordinates such as location coordinates based on GPS data which may appear as discrete points (e.g., location updates being separated in time by 15 minutes are spaced apart) and location coordinates based on mobile data which may be represented as a continuous or near-continuous line (e.g., location coordinates transmitted in real-time). The location coordinates based on GPS data may be superimposed on the location coordinates based on mobile data on the user interface of the responder device 120, as the mobile data supplements the GPS data near shore, and location coordinates of the water vessel based on GPS data continue to be transmitted by the water vessel.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for seamlessly tracking a location of a water vessel by supplementing satellite data with mobile data based on proximity of a water vessel to shore through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:
receiving a Global Positioning System (GPS) location of a water vessel, the GPS location of a water vessel based on using satellite data of the water vessel;
determining that the GPS location is within a threshold distance of a boundary of detectable mobile signal range;
responsive to determining that GPS location of a water vessel is within the threshold distance of the boundary of detectable mobile signal range, initiating monitoring for a mobile signal, the mobile signal emanating from a trajectory path of the water vessel and from a mobile device not registered with the water vessel;

responsive to detecting, during the monitoring, the mobile signal, associating the mobile device with the water vessel;

tracking the location of the water vessel based on the mobile signal, the tracking resulting in a tracked location;

inputting the tracked location, a scheduled location of the water vessel, and one or more environmental factors into a machine learning model, the machine learning model trained to output information corresponding to a suggested path to reach a destination based on its inputs; and transmitting, to a responder device, the information corresponding to the suggested path.

2. The method of claim 1, wherein the detected mobile signal is based on a transmission from a mobile Internet of Things (IoT) device on the water vessel, the mobile IoT device being coupled to a power supply of the water vessel.

3. The method of claim 1, further comprising:
identifying the mobile signal is being transmitted from the mobile device; and
receiving, from a central locator system, information indicating that the mobile device is not registered with the water vessel.

4. The method of claim 1, further comprising:
receiving, from a client device being operated by a friend or a relative of a user associated with the mobile device, a request to receive tracking updates of the mobile device transmitting the mobile signal on the water vessel.

5. The method of claim 4, further comprising providing, to the client device, the tracked location in parallel with providing, to the responder device, the tracked location.

6. The method of claim 1, the method further comprising:
responsive to the tracked location of the water vessel deviating by a trajectory threshold distance from an estimated trajectory, transmitting an alert to the responder device.

7. The method of claim 1, wherein the scheduled location of the water vessel is received from a central locator system.

8. A non-transitory computer-readable medium comprising instructions encoded thereon for enabling seamlessly tracking a location of a water vessel by supplementing satellite data with mobile data based on proximity of the water vessel to shore, the instructions, when executed by one or more processors, causing the one or more processors to perform operations, the instructions comprising instructions to:
receive a Global Positioning System (GPS) location of the water vessel, the GPS location of the water vessel based on using the satellite data of the water vessel;
determine that the GPS location is within a threshold distance of a boundary of detectable mobile signal range;
responsive to determining that GPS location of a water vessel is within the threshold distance of the boundary of detectable mobile signal range, initiate monitoring for a mobile signal, the mobile signal emanating from a trajectory path of the water vessel and from a mobile device not registered with the water vessel;
responsive to detecting, during the monitoring, the mobile signal, associate the mobile device with the water vessel;
track the location of the water vessel based on the mobile signal, the tracking resulting in a tracked location;
input the tracked location, a scheduled location of the water vessel, and one or more environmental factors into a machine learning model, the machine learning model trained to output information corresponding to a suggested path to reach a destination based on its inputs; and
transmit, to a responder device, the information corresponding to the suggested path.

9. The non-transitory computer-readable medium of claim 8, wherein the detected mobile signal is based on a transmission from a mobile Internet of Things (IoT) device on the water vessel, the mobile IoT device being coupled to a power supply of the water vessel.

10. The non-transitory computer-readable medium of claim 8, the instructions further comprising instructions to:
identify the mobile signal is being transmitted from the mobile device; and
receive, from a central locator system, information indicating that the mobile device is not registered with the water vessel.

11. The non-transitory computer-readable medium of claim 8, the instructions further comprising instructions to:
receive, from a client device being operated by a friend or a relative of a user associated with the mobile device, a request to receive tracking updates of the mobile device transmitting the mobile signal on the water vessel.

12. The non-transitory computer-readable medium of claim 11, the instructions further comprising instructions to provide, to the client device, the tracked location in parallel with providing, to the responder device, the tracked location.

13. The non-transitory computer-readable medium of claim 8, the instructions further comprising instructions to:
responsive to the tracked location of the water vessel deviating by a trajectory threshold distance from an estimated trajectory, transmit an alert to the responder device.

14. The non-transitory computer-readable medium of claim 8, wherein the scheduled location of the water vessel is received from a central locator system.

15. A system comprising:
memory with instructions encoded thereon for seamlessly tracking a location of a water vessel by supplementing satellite data with mobile data based on proximity of the water vessel to shore; and
one or more processors that, when executing the instructions, are caused to perform operations comprising:
receiving a Global Positioning System (GPS) location of the water vessel, the GPS location of the water vessel based on using the satellite data of the water vessel;
determining that the GPS location is within a threshold distance of a boundary of detectable mobile signal range;
responsive to determining that GPS location of a water vessel is within the threshold distance of the boundary of detectable mobile signal range, initiating monitoring for a mobile signal, the mobile signal emanating from a trajectory path of the water vessel and from a mobile device not registered with the water vessel;
responsive to detecting, during the monitoring, the mobile signal, associating the mobile device with the water vessel;
tracking the location of the water vessel based on the mobile signal, the tracking resulting in a tracked location;
inputting the tracked location, a scheduled location of the water vessel, and one or more environmental factors into a machine learning model, the machine learning model trained to output information corresponding to a suggested path to reach a destination based on its inputs; and transmitting, to a responder device, the information corresponding to the suggested path.

16. The system of claim 15, wherein the detected mobile signal is based on a transmission from a mobile Internet of Things (IoT) device on the water vessel, the mobile IoT device being coupled to a power supply of the water vessel.

17. The system of claim 15, the operations further comprising:

identifying the mobile signal is being transmitted from the mobile device; and receiving, from a central locator system, information indicating that the mobile device is not registered with the water vessel.

18. The system of claim 15, the operations further comprising:

receiving, from a client device being operated by a friend or a relative of a user associated with the mobile device, a request to receive tracking updates of the mobile device transmitting the mobile signal on the water vessel.

19. The system of claim 18, the operations further comprising providing, to the client device, the tracked location in parallel with providing, to the responder device, the tracked location.

20. The system of claim 15, the operations further comprising:

responsive to the tracked location of the water vessel deviating by a trajectory threshold distance from an estimated trajectory, transmitting an alert to the responder device.

* * * * *